(12) United States Patent
Sorensen

(10) Patent No.: US 11,004,113 B1
(45) Date of Patent: May 11, 2021

(54) ELECTRONIC DEVICE WITH CAMERAS AND DISPLAY FOR IN-STORE MESSAGING

(71) Applicant: Shopper Scientist LLC, Corbett, OR (US)

(72) Inventor: Herb Sorensen, Corbett, OR (US)

(73) Assignee: SHOPPER SCIENTIST LLC, Corbett, OR (US)

( * ) Notice: Subject to any disclaimer, the term of this patent is extended or adjusted under 35 U.S.C. 154(b) by 0 days.

(21) Appl. No.: 16/994,440

(22) Filed: Aug. 14, 2020

(51) Int. Cl.
*G06Q 30/02* (2012.01)
*G06F 1/16* (2006.01)
*G06F 3/01* (2006.01)
*G09F 9/30* (2006.01)
*G09F 27/00* (2006.01)
*G06N 3/08* (2006.01)
*G06F 3/147* (2006.01)

(52) U.S. Cl.
CPC ....... *G06Q 30/0261* (2013.01); *G06F 1/1605* (2013.01); *G06F 3/013* (2013.01); *G06F 3/147* (2013.01); *G06N 3/08* (2013.01); *G09F 9/30* (2013.01); *G09F 27/005* (2013.01); *G09F 2027/001* (2013.01)

(58) Field of Classification Search
CPC .. H04N 5/272; G06K 9/6256; G06K 9/00765; G06K 9/00744; G06K 9/6262; H01R 13/701; G06F 9/542
See application file for complete search history.

(56) References Cited

U.S. PATENT DOCUMENTS

2012/0271712 A1* 10/2012 Katzin .................. G07G 3/003
705/14.51
2020/0335917 A1* 10/2020 Opferman ............... H04L 67/12

* cited by examiner

*Primary Examiner* — Phuoc H Doan
(74) *Attorney, Agent, or Firm* — Alleman Hall Creasman & Tuttle LLP

(57) ABSTRACT

An electronic device for a store is provided comprising a front-facing camera, a rear-facing camera, a display, and processing circuitry configured to receive an identity of at least one target product that meets one or more predetermined product criteria. The processing circuitry is further configured to capture a first image via the rear-facing camera and determine that the target product proximate the electronic device is depicted in the first image, and to capture a second image via the front-facing camera and detect a shopper in a vicinity of the electronic device is depicted in the second image. The processing circuitry is further configured to in response to determining that the target product proximate the electronic device is depicted in the first image and detecting that the shopper in a vicinity of the electronic device is depicted in the second image, displaying a message related to the target product.

19 Claims, 11 Drawing Sheets

ELECTRONIC DEVICE WITH CAMERAS AND DISPLAY FOR IN-STORE MESSAGING

BACKGROUND

Stores often stock many more products than a shopper wishes to purchase. For example, a supermarket may stock more than 40,000 total products while the shopper may only purchase hundreds of top selling products per year. Because the total products greatly outnumber the top selling products and because the top selling products may be stocked in various locations in the store, it may be difficult for the shopper to find the top selling products. This may result in lower sales for the store, and an increase in time the shopper spends in the store leading to a less than optimal shopping experience. Challenges exist to presenting in-store messaging that guides shopper behavior in a manner that is effective for both the shopper and the store. In one conventional practice, a store employee may place printed paper or plastic signs proximate top selling products to direct the attention of shoppers, however this may be time consuming and may require the signs be moved as top selling products are moved from one location to another, or as one product replaces another as a top selling product. Further, changing a message or symbol on such printed signs requires replacement of the signs throughout the store. In some situations, printed signs may be too effective resulting in rapid purchases by shoppers until no stock remains on the shelf, yet the printed sign still remains displayed, which frustratingly draws the shopper's attention to an empty shelf. In other situations, shoppers may become accustomed to the presence of the signs, the effect of the signs on shopper behavior may wane, and products may languish on the shelves. In view of these challenges, opportunities exist for improving in-store messaging devices, and improving the overall shopping experience for the shopper.

SUMMARY

To address the above issues, an electronic device for a store is provided. The electronic device comprises a front-facing camera, a rear-facing camera, a display, and processing circuitry. The processing circuitry is configured to receive wirelessly from a remote computing device an identity of at least one target product that meets one or more predetermined product criteria. The processing circuitry is further configured to capture a first image via the rear-facing camera and determine that the target product proximate the electronic device is depicted in the first image. The processing circuitry is further configured to capture a second image via the front-facing camera and detect that a shopper in a vicinity of the electronic device is depicted in the second image. The processing circuitry is further configured to, in response to determining that the target product proximate the electronic device is depicted in the first image and detecting that the shopper in a vicinity of the electronic device is depicted in the second image, display a message related to the target product on the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
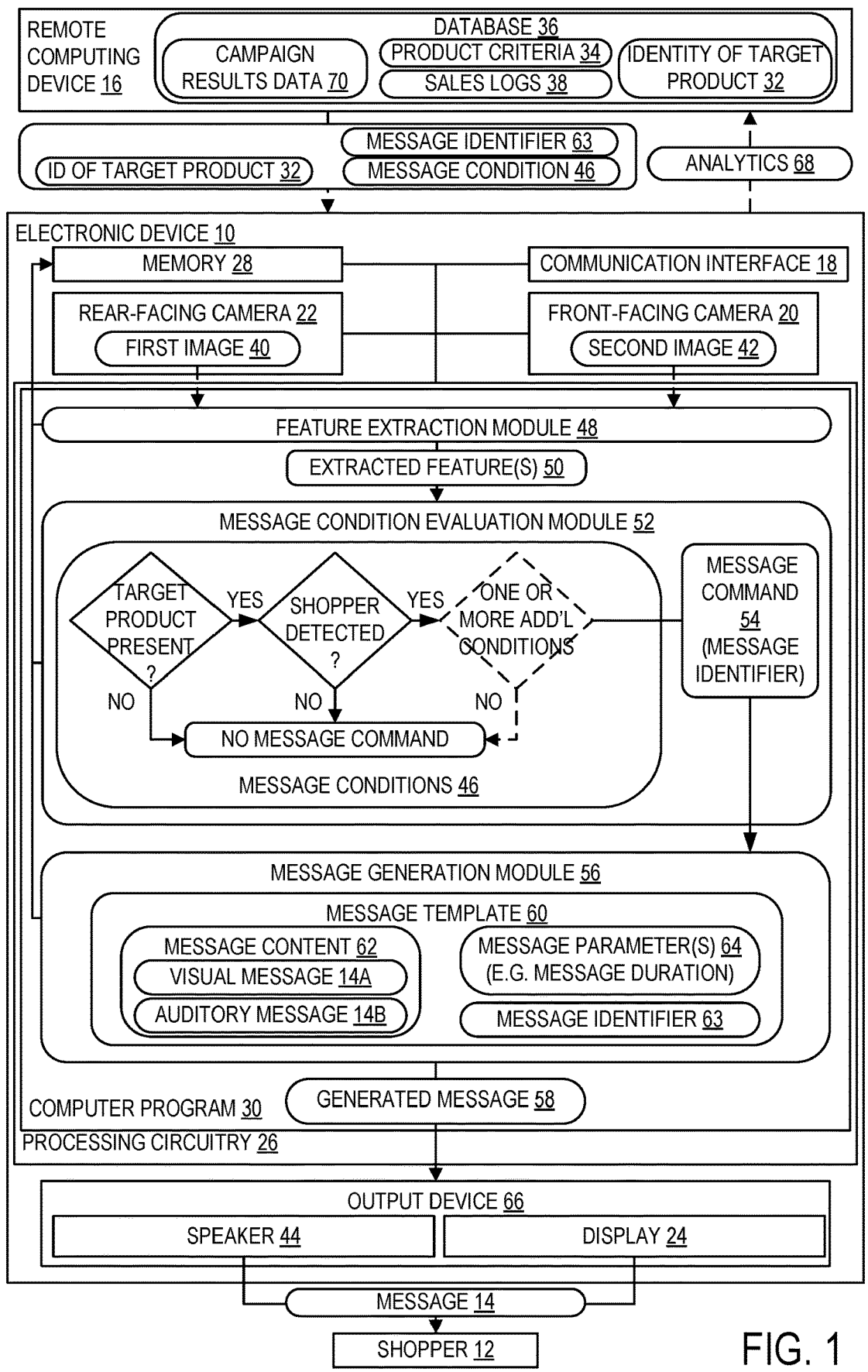
FIG. 1 is a schematic showing an electronic device for a store delivering a message to a shopper.

To address the issues discussed above, as shown in FIG. 1, an electronic device 10 for a store is provided, which presents to a shopper 12 a message 14 under certain conditions, as described below. The electronic device 10 is in communication with a remote computing device 16, via a communication interface 18 (e.g., a Wi-Fi or Bluetooth interface), and presents the message 14 to the shopper 12. The electronic device 10 may be placed on a store shelf or any other suitable location in the store where the electronic device 10 may be seen and/or heard by the shopper 12, although typically the location is chosen so that cameras associated with the electronic device 10 can capture an image of the shopper 12 and a target product as described below.

As the shopper 12 moves through the store, the shopper 12 may be shopping in one of various mindsets. The shopper 12 may be browsing the store to look for products that might interest them, hunting for a specific product, or simply passing through. In each of these scenarios the attention of shopper 12 may be attracted by a message 14 presented by the electronic device to entice, consciously or subconsciously, shopper 12 to pause and consider a purchase of the product. However, if the message 14 to the shopper 12 is always or continuously presented on the electronic device 10, the message 14 may lose its ability to be noticed by the shopper 12. To this end, upon detection of certain message conditions 46, for example a target product being proximate the electronic device 10 and the shopper 12 being in the vicinity of the electronic device 10, the electronic device 10 presents a visual and/or auditory message 14A, 14B to aid the shopper 12 in locating the target product. By presenting a message 14 in this manner, the electronic device 10 can improve the shopper reaction to the message 14, for example, by improving the pickup or purchase ratio in response to displayed messages 14. If desired, the message can be selected based upon how fast the shopper is moving by the electronic device 10 so messages can be tuned to each of these types of shopper mindsets, as described below.

Figure 2:
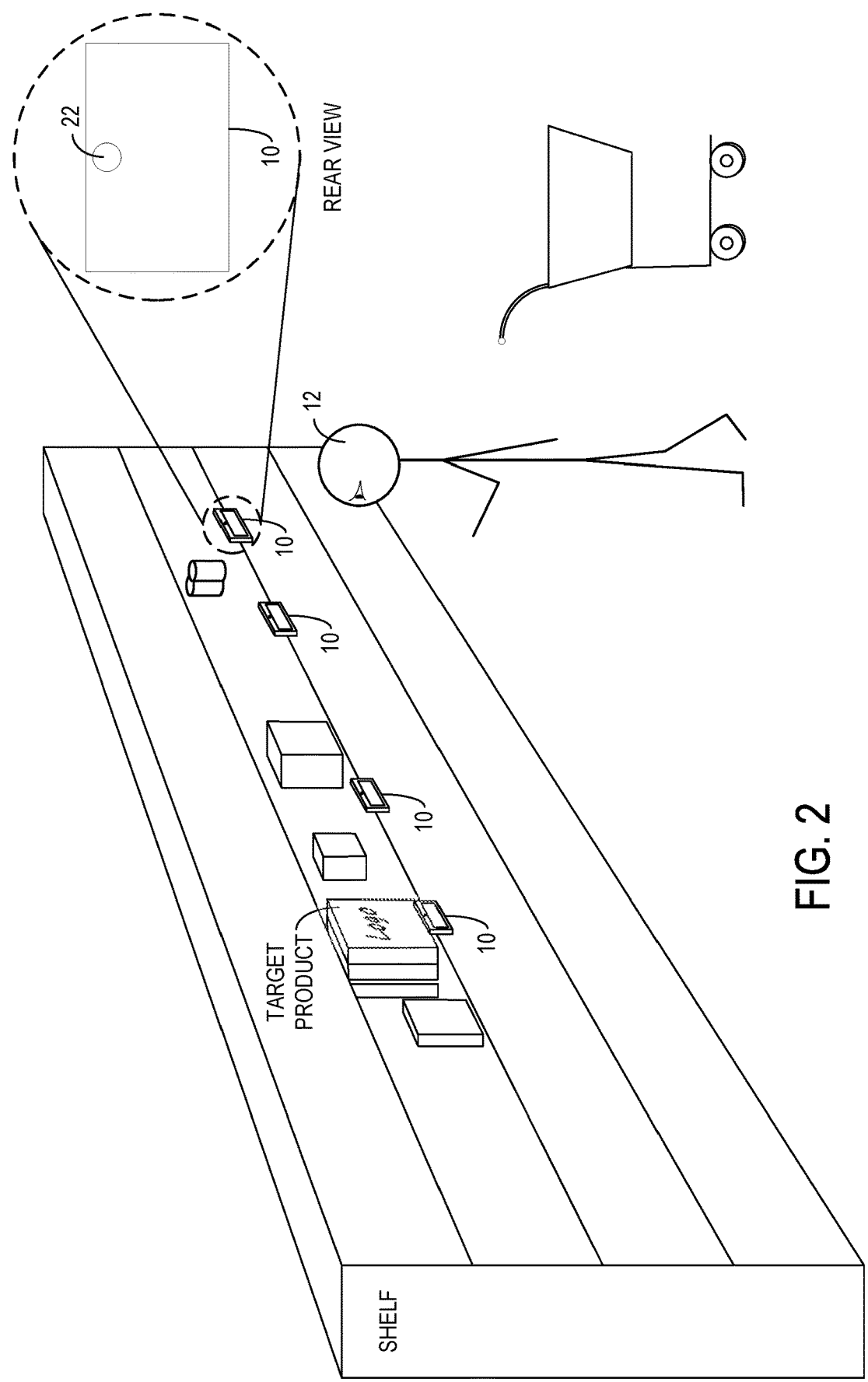
FIG. 2 is a perspective view of multiple electronic devices of FIG. 1 placed on a multi-level shelf of a store.
Figure 3:
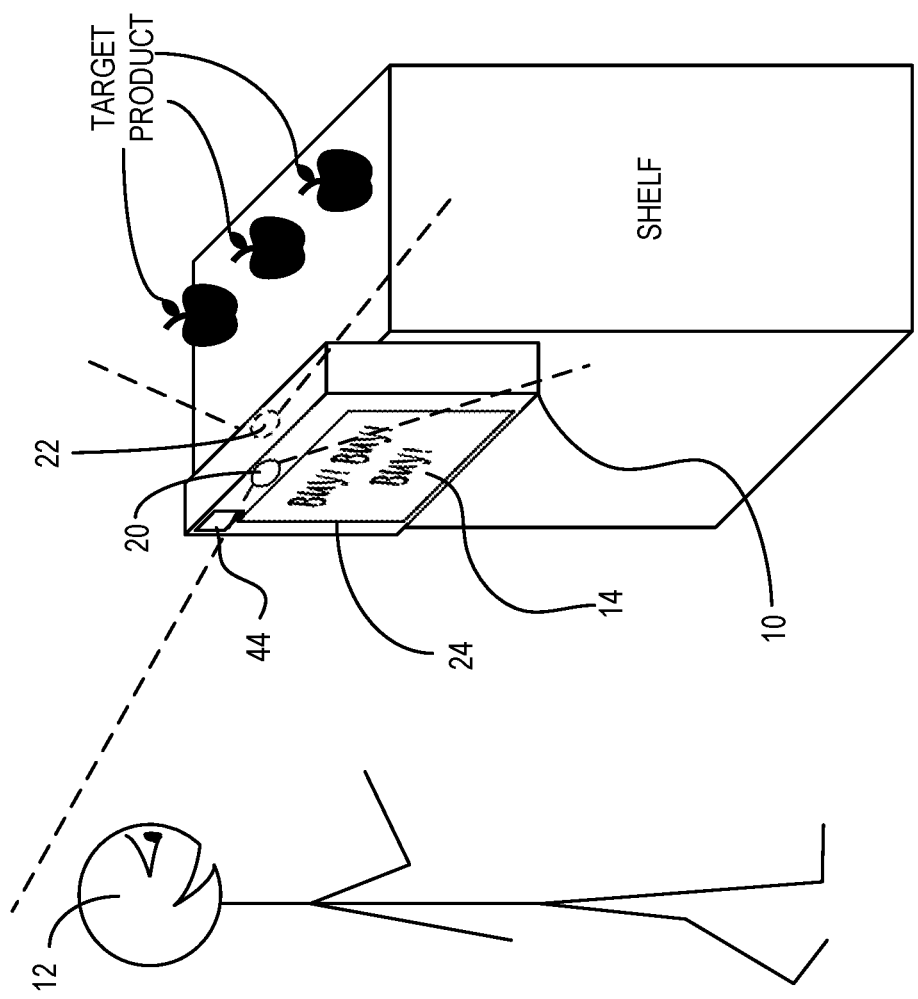
FIG. 3 is a perspective view of the electronic device of FIG. 1 as is displays a message to a shopper from a position between the shopper and a bazaar style shelf, the electronic device shown in an enlarged form factor for the purpose of illustration.
Figure 4:
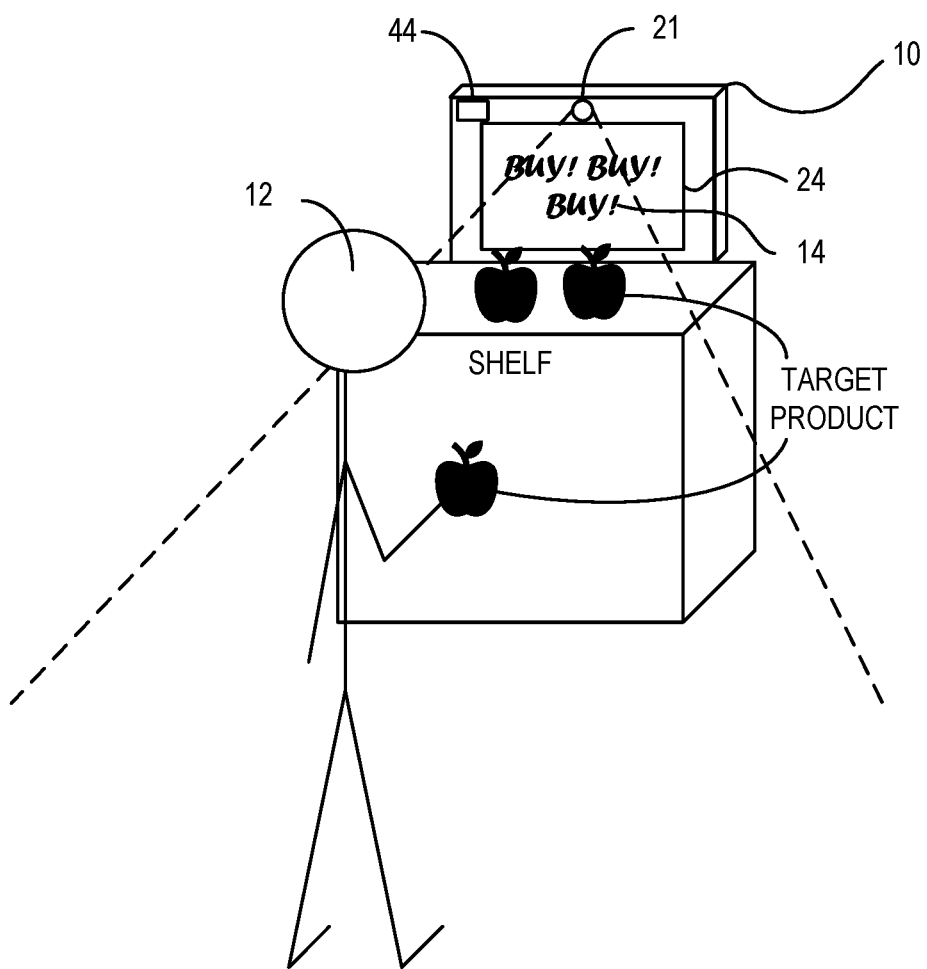
FIG. 4 is a perspective view of another embodiment of the electronic device of FIG. 1 as is displays a message to a shopper from a position imaging both the bazaar style shelf and the shopper with a single camera, the electronic device shown in an enlarged form factor for the purpose of illustration.

Continuing with FIG. 1, the electronic device 10 for a store includes a front-facing camera 20, a rear-facing camera 22, a display 24, processing circuitry 26, and associated memory 28 that stores a computer program 30 that when executed by the processing circuitry 26 causes the electronic device 10 to perform the following processes. The processing circuitry is configured to receive wirelessly from the remote computing device 16 an identity of at least one target product 32 that meets one or more predetermined product criteria 34. The one or more predetermined product criteria 34 may include being one of a plurality of top selling products or being selected by an administrator. The identity of the target product 32 and the predetermined product criteria 34 are stored in a database 36 of the remote computing device 16. Other data related to the store or the products in the store may also be stored in the database 36. For example, the remote computing device 16 may be configured to record sales logs 38 of target products in the store. Allowing the one or more predetermined product criteria 34 to include being selected by the administrator, the administrator is able to take advantage of the electronic device for purposes other than indicating a top-selling product. For example, the store may have in stock a discontinued product. The administrator may wish to completely sell the discontinued product to provide additional space in the store. The administrator could select the discontinued product to promote pickup to more quickly provide the additional space. It will be appreciated that the term rear-facing refers to a camera that faces the target product, typically on a shelf or display, and the term front-facing refers to a camera that faces a shopping area where a shopper approaches to purchase the target product. Typically, these cameras are oriented back to back and face in opposite directions separated by 180 degrees. FIG. 2 shows multiple electronic devices 10 of this embodiment placed on a shelf of a store, as a shopper browses an aisle, while FIG. 3 shows an enlarged view of the same embodiment. Alternatively, one or both cameras may be tilted at an angle and they may not be separated by 180 degrees. As yet another alternative embodiment depicted in FIG. 4, a single camera 21 may be provided that is configured to capture an image of a scene including both the shopper 12 and the target product, the single camera 21 otherwise being configured to perform the functions of both the rear-facing and front-facing cameras described herein. It will be appreciated that the electronic device 10 as depicted in FIGS. 3 and 4 is not sized to scale, but exaggerated for ease of illustrating details of the device.

Returning now to FIG. 1, with the identity of the at least one target products 32 stored in the memory 28 of the electronic device, the electronic device 10 may determine that a target product is proximate the electronic device 10 by capturing a first image 40 via the rear-facing camera 22, and determining that the target product proximate the electronic device 10 is depicted in the first image 40. To accomplish this, the remote computing device 16 may be further configured to store a stored image of the target product, and to store one or more messages 14 related to the target product.

Determining that the target product proximate the electronic device 10 is depicted in the first image 40 includes comparing the first image 40 to the stored image of the target product. It will be appreciated that the first image 40 is a rear image, i.e. an image captured by a camera facing to the rear of the electronic device 10. Although in this configuration, determining that a target product is proximate the electronic device 10 is accomplished in part with the rear-facing camera 22, in other configurations, a sensor other than the rear facing camera may be used to detect the presence of the target product proximate the electronic device. For example, the target product may carry a radio frequency identification (RFID) chip or barcode which may be detected by the electronic device 10 via a sensor such as an RFID reader or a barcode reader.

The electronic device 10 is further configured to capture a second image 42 via the front-facing camera 20 and detect that a shopper 12 in a vicinity of the electronic device 10 is depicted in the second image 42. It will be appreciated that the second image 42 is a front image, i.e. an image captured by a camera facing to the front of the electronic device 10. In one configuration, detecting that the shopper is within a vicinity of the electronic device includes detecting that the shopper is within a predetermined distance of the electronic device and that a gaze of the shopper is within a predetermined angle with respect to a plane of the display. The predetermined distance and the predetermined angle may be determined by a user of the device such as an administrator. Alternatively, in another configuration, the computer program 30 may determine the predetermined distance and the predetermined angle. Such a configuration will be discussed in more detail below.

The electronic device 10 is further configured to display a message 14 related to the target product on the display 24. Additionally, the electronic device 10 may further comprise a speaker 44 and be further configured to deliver an auditory message 14B. Inclusion of a speaker 44 with the ability to deliver an auditory message 14B allows for the message 14 to be received by a visually impaired shopper 12 and shoppers 12 who are not looking at the electronic device, (i.e., for whom the electronic device is outside their field of view or for whom their gaze is directed in another direction).

Delivery of the message 14 may be based on at least one message condition 46. For example, the electronic device 10 may be configured to, in response to determining that the target product proximate the electronic device 10 is depicted in the first image 40 and detecting that the shopper 12 in a vicinity of the electronic device 10 is depicted in the second image 42, display a message 14 related to the target product on the display 24.

It will be appreciated that the electronic device 10 may be configured to display a message 14 based on one or more additional message conditions 46. Examples of additional message conditions 46 include number of shoppers 12 in a vicinity of the electronic device 10, a number of the target product remaining on the shelf, and a detected speed of travel of the shopper, although various other message conditions 46 may be included. By using one or more additional message conditions 46, the electronic device 10 is provided with a greater degree of message delivery flexibility and customization.

The electronic device 10 may be further configured to communicate with a store employee or an administrator via the remote computing device 16, directly via the electronic device 10, via a personal mobile device, or via any other suitable device or method. For example, the electronic device 10 for a store may be further configured to, via the rear-facing camera 22, determine a number of the target products remaining and notify a store employee if the number is below a predetermined limit. In a case wherein the target product is out of stock or limited in supply, the electronic device 10 for a store, may be further configured to, via the rear-facing camera 22, determine a number of the target products remaining and inhibit display of a second message when the number of the target product remaining is below a predetermined limit. By inhibiting a message 14 when the target product is not stocked, the shopper 12 will have confidence that the message 14 will always indicate that the target product is stocked. Without this confidence, the shopper 12 may encounter the frustrating situation of being enticed to purchase by a message, only to find an empty shelf, and because of this experience may learn to ignore the message 14, thus reducing usefulness of the message 14.

In addition to delivering a message to a shopper 12, the electronic device 10 may be employed to gather information about shopper behavior in a store environment. Such information may be used by a store employee, administrator, or other user. Examples of shopper behavior include a duration of time a shopper looks at a product or a duration of the shopper in the vicinity of the electronic device 10. Accordingly, the electronic device 10 may be further configured to record a duration of the shopper 12 in a vicinity of the electronic device 10 and convey the duration of the shopper 12 in a vicinity of the electronic device 10 to the remote computing device 16. Speed of travel of each shopper in the vicinity of the electronic device is another example of shopper behavior that may be recorded and reported to the remote computing device 16. This information may be used when considering placement of products within the store, or in evaluating effectiveness of the message. Another example of shopper behavior is a duration between displaying the message 14 and a pickup of the target product. This behavior may be used in evaluating effectiveness of the message 14. One way this behavior may be recorded is by further configuring the electronic device 10 to record a change in the first image 40 via the rear-facing camera 22, record the pickup of the target product, and record a duration between displaying the message 14 and the pickup of the target product.

It may be desirable to record positions of shoppers 12 as they pass the electronic device 10 and to forward that position data to the remote computing device 16. Accordingly, the electronic device 10 may be further configured to record respective positions of one or more shoppers 12 within the store and convey the respective positions of the one or more shoppers 12 to the remote computing device 16. While the above description focuses on the application of one electronic device 10 in relation to one shopper 12, it will be appreciated more than one electronic device 10 may be deployed in the store to gather information in relation to more than one shopper 12. For example, the store may be a grocery store, and a separate electronic device 10 may be placed within various locations of the grocery store including a deli counter, a dairy case, a meat counter, and a center of a salty snack aisle. The position data may be taken over time. As discussed above, the message 14 to be displayed can be selected based upon how fast the shopper 12 is moving by the electronic device 10. Accordingly, in one example implementation, a first message is presented when the shopper speed is above a first speed threshold, a second message is presented when the shopper speed is below the first threshold and above a second threshold. Further, a third message may be presented when the shopper speed is below the second threshold. It will be appreciated that in this example the first threshold is set higher than the second threshold. Such shopper speed conditions may be additional conditions as discussed above in relation to FIG. 1, and may be combined with the other additional conditions described herein.

Furthermore, while the above description discloses that the electronic device 10 is in communication with the remote computing device 16, it will be appreciated that multiple electronic devices 10 may be in communication with each other with or without the remote computing device 16. Such communication may be accomplished directly via the respective communication interfaces 18, or indirectly via a wireless area network (WAN), or the internet.

Figure 5:
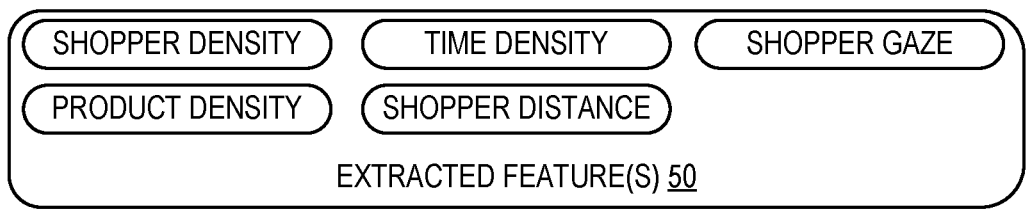
FIG. 5 is a schematic showing example features extracted by the electronic device of FIG. 1.

In order to describe how the above functions may be performed, additional details of the computer program 30 are provided below. Continuing with FIG. 1, the computer program 30 receives from the rear-facing camera 22 and the front-facing camera 20 the first image 40 and the second image 42, respectively. A feature extraction module 48 extracts features from the first image 40 and the second image 42 and sends extracted features 50 to a message condition evaluation module 52. Using the extracted features 50, the message condition evaluation module 52 determines message conditions 46 in order to determine that a message 14 will be displayed. As described above, displaying a message 14 related to the target product may be further conditioned upon one or more additional message conditions 46. The one or more additional message conditions 46 may be determined by at least one of the following as depicted in FIG. 5: a shopper density feature, a product density feature, a time density feature, a shopper distance feature, and a shopper gaze feature. As shown in the message condition evaluation module 52 of FIG. 1, displaying the message related to the target product on the display 24 is performed in response to determining that the target product proximate the electronic device 10 is depicted in the first image 40 and detecting that the shopper 12 in a vicinity of the electronic device 10 is depicted in the second image 42, and further in response to determining that the additional message condition 46 is satisfied. When other addition message conditions 46 are applied, the message condition evaluation module 52 may be configured to determine shopper density or determine a number of remaining products, for example.

In the case that at least one message condition 46 is not met, no message command is given. In the case that all message conditions 46 are met, a message command 54 is given to the message generation module 56. The message generation module 56 creates a generated message 58 based upon a message template 60 that may be provided by the remote computing device 16. The message template 60 includes message content 62 including at least one of a visual message 14A and an auditory message 14B. The message template 60 further includes a message identifier 63 based upon the identity of the target product 32. The message template further includes at least one message parameter 64. Possible message parameters 64 include message duration, wherein the duration that the message 14 is delivered is varied, message volume in the case of auditory message 14B, and message brightness in the case of a visual message 14A. Alternatively in the case of a visual message 14A, the message 14 may include a pulsing illuminated textual message or image. In addition to pulsing, a variety of animated qualities may be imparted to the visual message 14A to cause it to stand out.

The generated message 58 is sent to the output device 66 comprising the speaker 44 and the display 24 through which the message 14 is delivered to the shopper 12. The rear-facing camera 22 and front-facing camera 20 may be configured to capture additional images in order to determine that the message 14 results in a pickup of the target product. All images and data gathered by the electronic device 10 may be communicated to the remote computing device 16 as analytics 68 and stored in the database 36 for further processing. The identities of the messages 14 presented, in combination with data indicating whether the messages 14 resulted in pickups, are all stored in the database 36 as campaign results data 70.

Figure 6:
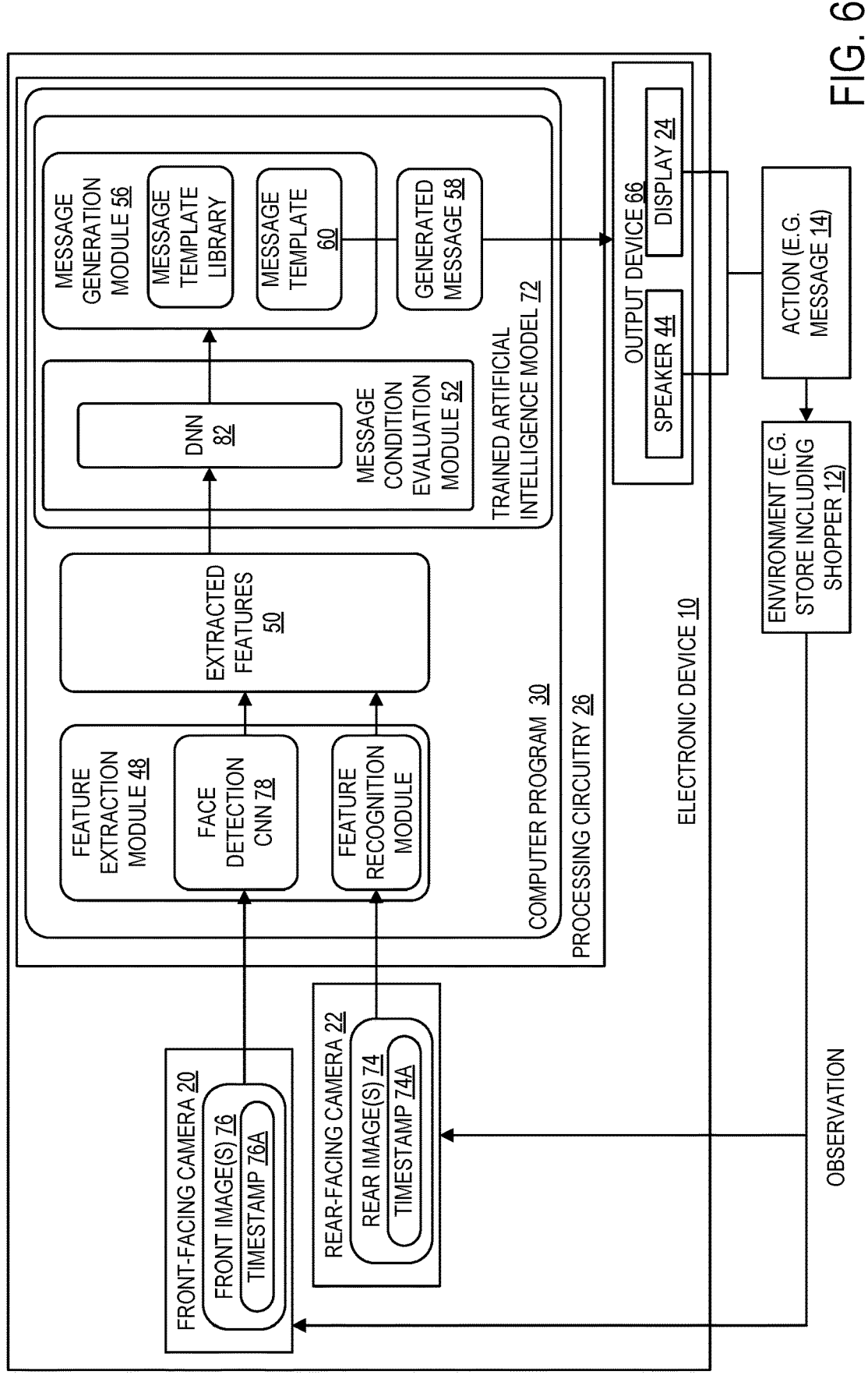
FIG. 6 is a schematic showing the electronic device of FIG. 1 equipped with a trained artificial intelligence model operating in a run-time phase.

The above described computer program 30 and associated modules may be preprogramed prior to the electronic device 10 being placed in the store. Alternatively, as shown in FIG. 6, the computer program 30 may be configured to execute an artificial intelligence model 72 that may be trained after the electronic device 10 has been placed in a store in response to shopping behavior. FIG. 6 shows schematically the electronic device 10 configured to execute, in a runtime phase, the computer program 30 including an artificial intelligence model 72 after training. The artificial intelligence model 72 includes the message condition evaluation module 52 and the message generation module 56 previously described and illustrated in FIG. 1. As shown in FIG. 6, the rear-facing camera 22 is configured to capture a series of rear images 74. The rear images 74 may be assigned associated metadata. For example, each of the series of rear images 74 may have an associated timestamp 74A, geolocation tag, or other forms of metadata. Similarly, the front-facing camera 20 is configured to capture a series of front images 76, each of the series of front images 76 having an associated timestamp 76A, geolocation tag, or other forms of metadata. The processing circuitry 26 is further configured to, via the feature extraction module 48 of the computer program 30, extract from the series of rear images 74 and the series of front images 76 a plurality of features as input into the artificial intelligence model 72; and output in response to receiving a runtime input an action in the form of the message according to a message template 60.

The feature extraction module 48 includes a face detection convolutional neural network (CNN) 78 that receives the series of front images 76. The face detection CNN 78 generates extracted features 50 including the shopper density feature, the shopper gaze feature, and the shopper distance feature. The feature extraction module 48 further includes a feature recognition module 80 that extracts the time density feature and the product density feature. The extracted features are input into the message condition evaluation module 52 which includes a deep neural net (DNN) 82 which outputs a vector that is provided as input into the message generation module 56. The message generation module 56 outputs the generated message 58 as described above in relation to FIG. 1. The artificial intelligence model 72 may be trained on the plurality of features from the front images 76 as training time input and from the rear images 74 as ground truth classification of the front-facing images at training time.

Figure 7:
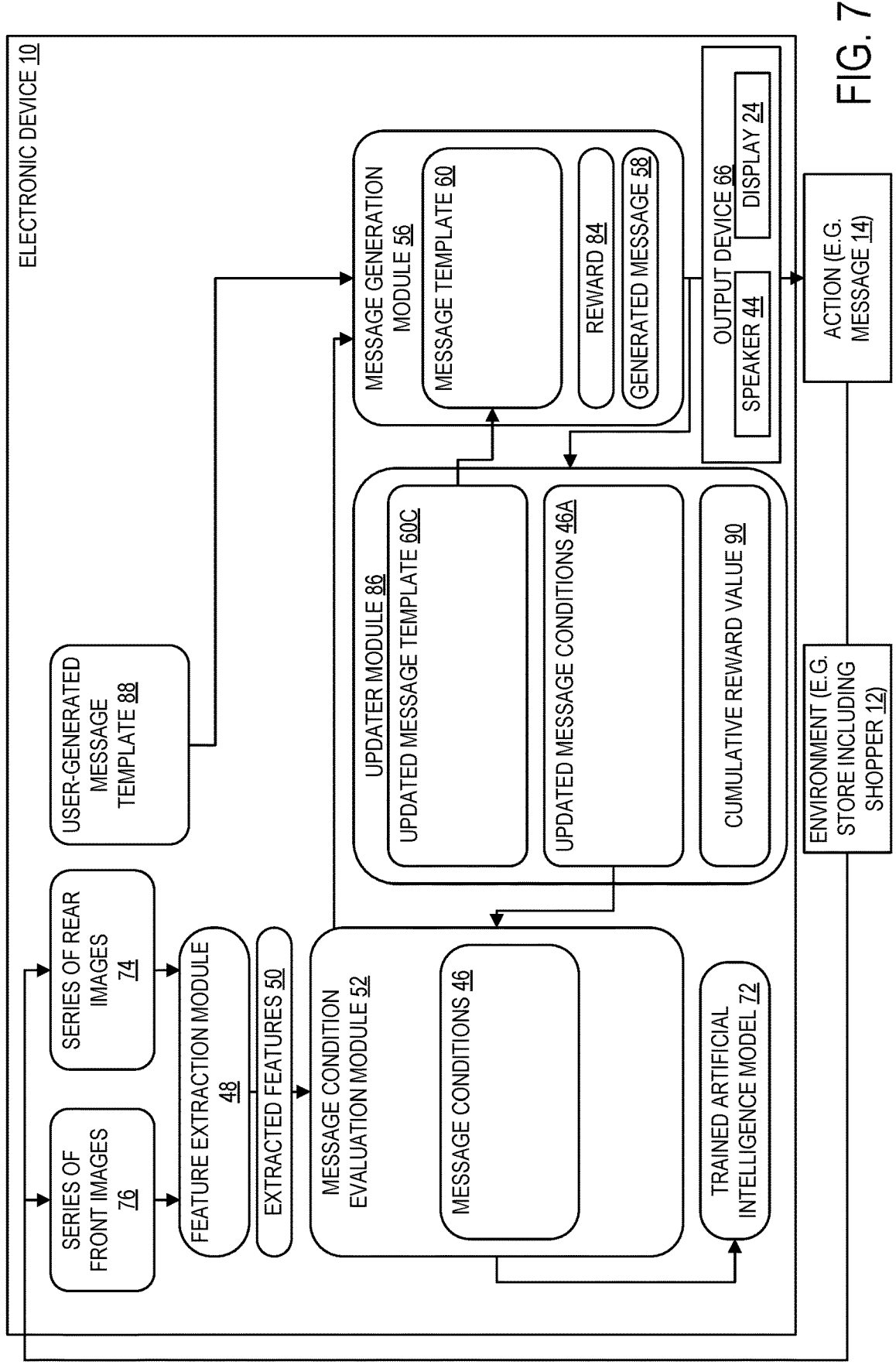
FIG. 7 is a schematic showing the electronic device of FIG. 1 operating in a training phase to train the artificial intelligence model.

Turning now to FIG. 7, the electronic device 10 in a training phase is illustrated. FIG. 7 depicts an example training scenario in which the artificial intelligence model 72 is a reinforcement learning model and uses as a reward 84 a pickup ratio. Although depicted as a reinforcement learning model, it will be appreciated that other artificial intelligence models and paradigms may be used. In this example, the pickup ratio is defined as a number of pickups of the target product divided by a number of messages 14 displayed, although it will be appreciated that other definitions of pickup ratio may be used.

To train the artificial intelligence model 72, the electronic device 10 is placed in the store such that the target product is proximate the electronic device 10. The electronic device is configured to capture a series of rear images 74 from the rear-facing camera 22, each of the series of rear images 74 having an associated timestamp 74A, and capture a series of front images 76 from the front-facing camera 20, each of the series of front images 76 having an associated timestamp 76A as described above in relation to FIG. 6. The electronic device 10 is further configured to generate a training data set with rear images 74, front images 76, a first message template 60A, and a second message template 60B. The electronic device 10 alternately displays the message 14 based on the first message template 60A and the second message template 60B and records pickups of the target product. Based on the pickups resulting from the message 14 based on the first message template 60A and the message 14 based on the second message template 60B, the electronic device 10 trains the artificial intelligence model 72 to predict whether the first message template 60A or the second message template 60B results in a higher pickup ratio, which is defined as the total number of target product pickups that were detected within a predetermined time period after the commencement of a message impression, divided by the total number message impressions. A message impression is one instance of a message being presented to a shopper via the electronic device. After training, the electronic device 10 may, in a runtime phase, display the message 14 related to the target product on the display 24 by outputting, in response to receiving a runtime input, an action in the form of the message 14 according to the message template 60. that results in the higher pickup.

Both the message condition evaluation module 52 and the message template 60 may be optimized by the artificial intelligence model 72. A function of the message condition evaluation module 52 is to determine the message conditions 46 under which the message command 54 is sent to the message generation module 56. During optimization, varying weights are assigned to the extracted features 50 for each message 14 displayed to the shopper 12. Similarly, the message template 60 may be optimized by the artificial intelligence model 72 and may include at least one of the following: a message duration, and a message selection, wherein one of a plurality of predetermined messages is selected by the artificial intelligence model.

Optimizations of the message condition evaluation module 52 and the message generation module are accomplished in part with an updater module 86. Optimization may occur in cycles. In a given cycle of training in the training phase, the updater module 86 is configured to receive the message template 60 and the message conditions 46. Prior to training, a user-generated message template 88 may be provided. The updater module 86 is further configured to receive the reward 84 based on the message 14 resulting in a pickup. The updater module 86 sends updated message conditions 46A and an updated message template 60C to the message condition evaluation module 52 and the message generation module 56 respectively. The success of subsequent messages 14 are similarly evaluated, and the message condition evaluation module 52 and message generation module 56 are updated. Long-term success of the training is recorded as a cumulative reward value 90. In the manner described above, reinforcement learning techniques may be employed to update both the message template itself (i.e., the content and presentation of the message) as well as the conditions under which the message is displayed, to thereby maximize target product pickups.

It will be appreciated that when multiple electronic devices 10 are deployed within the store, each electronic device 10 can be individually optimized using such this approach. This allows the message 14 to be customized based on factors including the target product in the vicinity of the electronic device, the location of the target product in the store, the height of the target product on the shelf, or any other factor.

Figure 8:
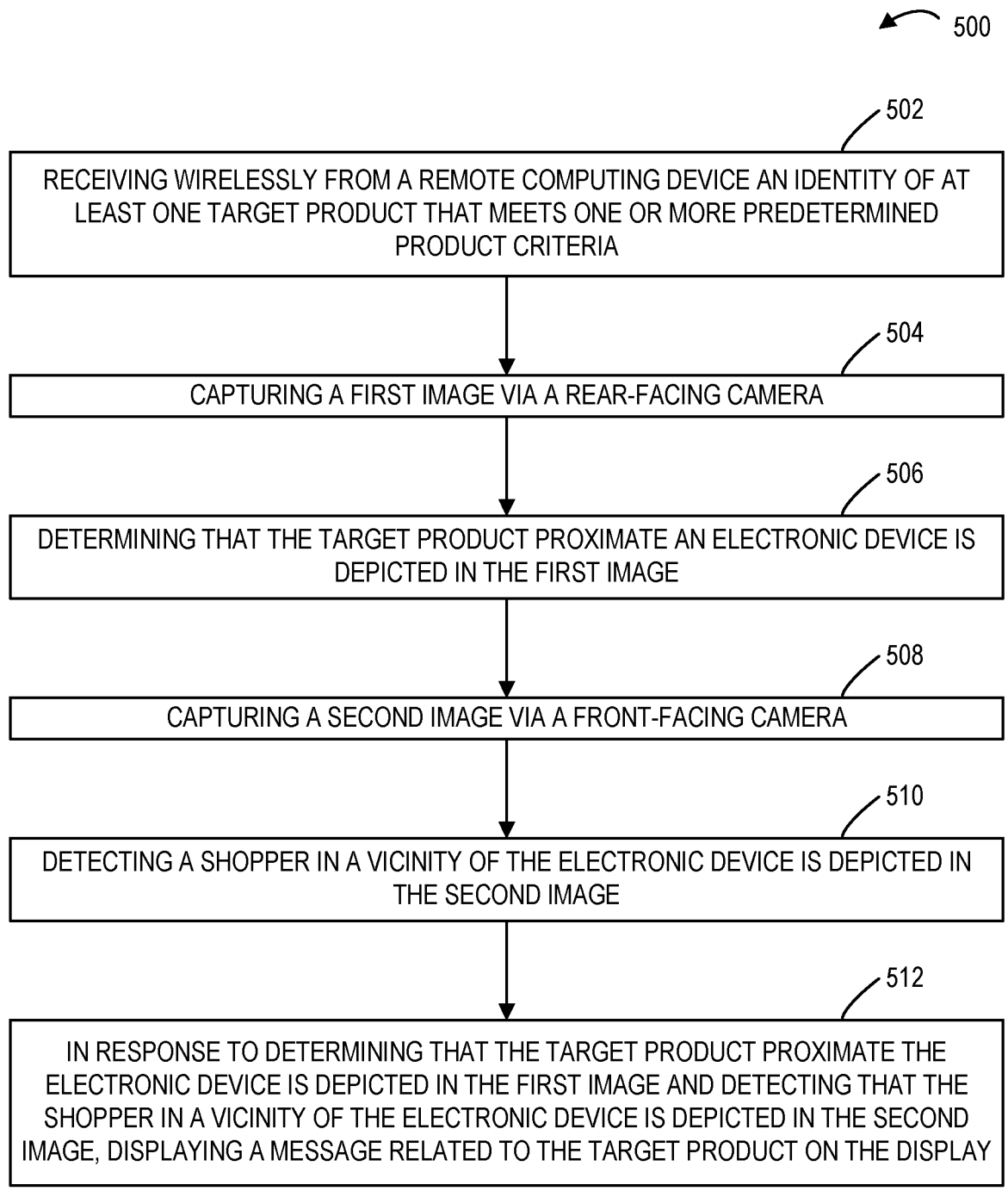
FIG. 8 is a flowchart for a message display method which may be implemented by the electronic device of FIG. 1.

Turning to FIG. 8, a message display method will now be described. It will be appreciated that the method 500 may be implemented using the above described electronic device 10, or other suitable hardware and software componentry.

A message display method 500 is provided. As illustrated, at 502, the method in one embodiment comprises receiving wirelessly from a remote computing device an identity of at least one target product that meets one or more predetermined product criteria. At 504, the method further comprises capturing a first image via a rear-facing camera. At 506, the method further comprises determining that the target product proximate an electronic device is depicted in the first image. At 508, the method further comprises capturing a second image via a front-facing camera. At 510, the method further comprises detecting a shopper in a vicinity of the electronic device is depicted in the second image. At 512, the method further comprises in response to determining that the target product proximate the electronic device is depicted in the first image and detecting that the shopper in a vicinity of the electronic device is depicted in the second image, displaying a message related to the target product on the display.

Figure 9A:
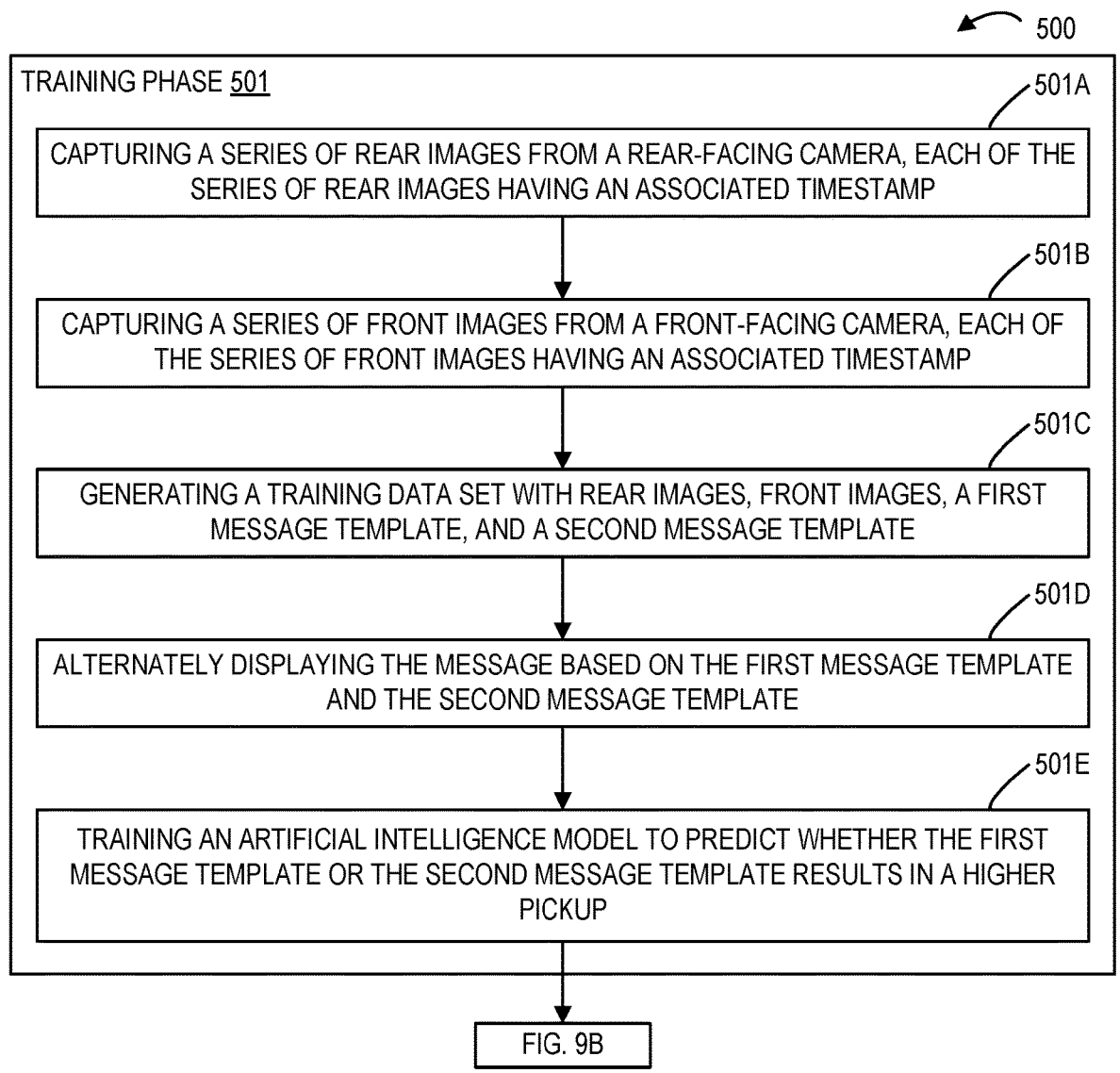
FIGS. 9A and 9B are flowcharts illustrating additional steps of the message display method of FIG. 8.

Turning to FIG. 9A, additional details of message display method 500 will now be described, which may be performed in combination with the method of FIG. 8. As illustrated at 501, the method in one embodiment comprises, via processing circuitry, a training phase, which typically is implemented before the step 502 in method 500 of FIG. 8 The training phase 501 comprises at 501A capturing a series of rear images from a rear-facing camera, each of the series of rear images having an associated timestamp. At 501B, the training phase further comprises capturing a series of front images from a front-facing camera, each of the series of front images having an associated timestamp. At 501C, the training phase further comprises generating a training data set with rear images, front images, a first message template, and a second message template. At 501D, the training phase further comprises alternately displaying the message based on the first message template and the second message template. At 501E, the training phase further comprises training an artificial intelligence model to predict whether the first message template or the second message template results in a higher pickup.

Figure 9B:
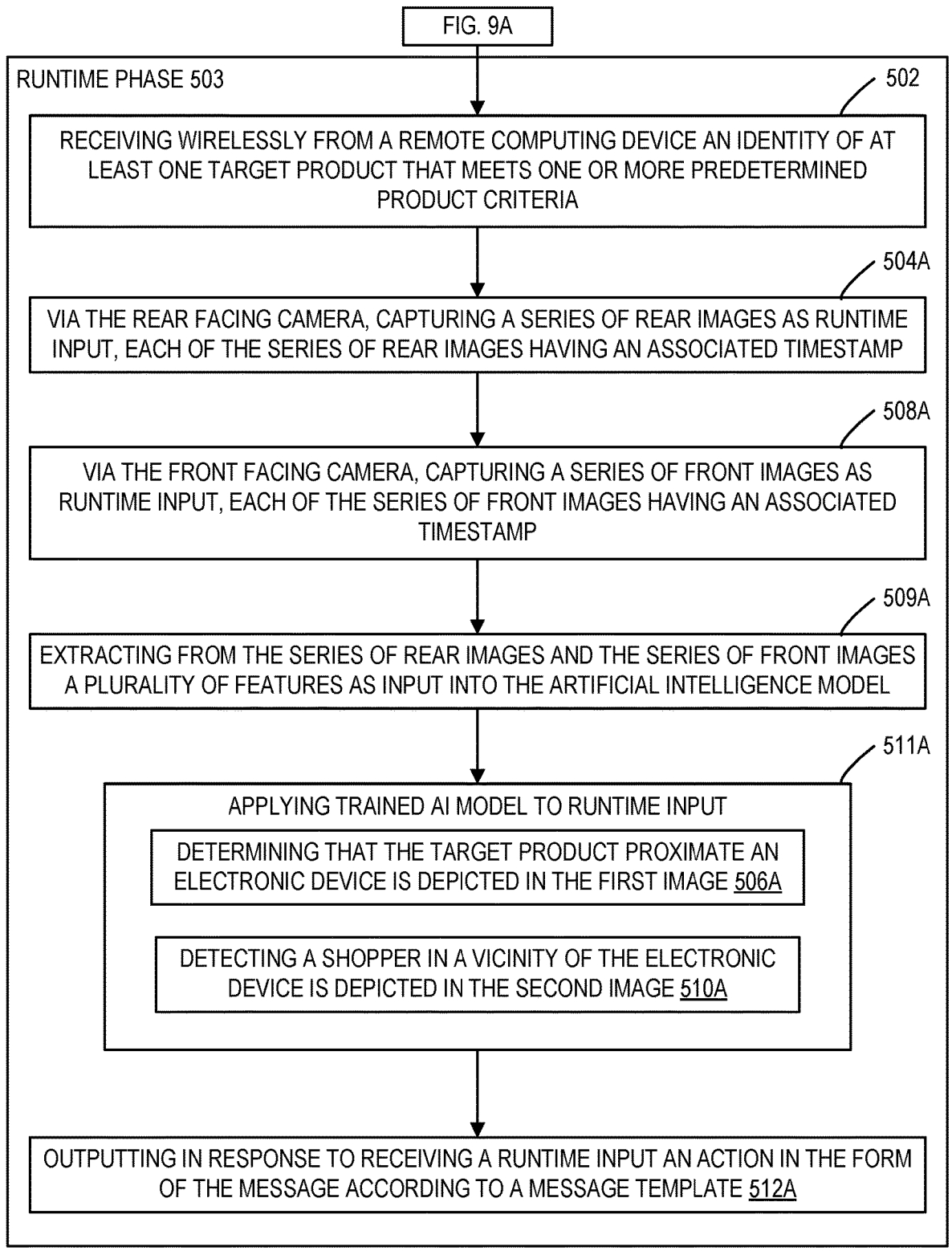

Turning now to FIG. 9B, the method further comprises a run-time phase 503, which is typically implemented as a variant of steps 504-512 in FIG. 8. At 504A, the run-time phase comprises, via the rear-facing camera, capturing a series of rear images, each of the series of rear images having an associated timestamp. At 508A, the run-time phase further comprises, via the front-facing camera, capturing a series of front images, each of the series of front images having an associated timestamp. At 509A, the run-time phase further comprises extracting from the series of rear images and the series of front images a plurality of features as input into the artificial intelligence model. At 511A, the run-time phase further comprises applying a trained artificial intelligence model to runtime input. Applying a trained artificial intelligence model to runtime input comprises at 506A, determining that the target product proximate the electronic device is depicted in the first images, and at 510A, detecting a shopper in a vicinity of the electronic device is depicted in the second image. At 512A, the run-time phase further comprises outputting in response to receiving a runtime input an action in the form of the message according to the message template.

The systems and methods described above may be implemented to provide in-store messaging that attracts the attention of the shopper, consciously or subconsciously, and entices the shopper to purchase particular target products within the store. The messaging can be as simple as a Staff Pick, Top Seller, or Recommended label that is digitally presented, for example. In some examples, the message may simply be a graphical icon such as a dot or exclamation point, and may not include any text. The electronic device 10 can give the store owner the ability to customize the messages and conditions under which the messages are displayed, providing a better shopping experience to the shopper since oversaturation with messages can be avoided, as can display of messages during out of stock situations. By providing appropriate message content, under appropriate conditions, the shopper is aided by being directed to products that the shopper wants to purchase, thereby increasing the efficiency and enjoyment of the shopping experience for the shopper. By utilizing reinforcement learning, the electronic devices themselves can be trained on a device by device and store by store basis to determine what messages and message conditions maximize target product pickups, thereby increasing the efficiency of the store.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
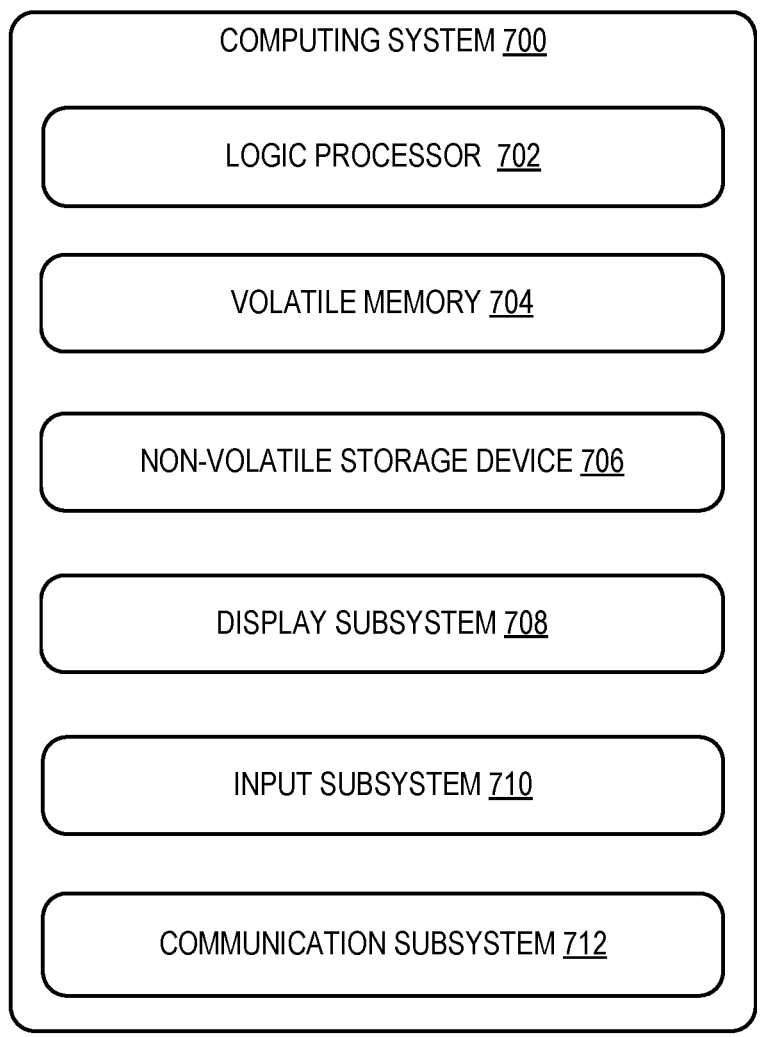
FIG. 10 illustrates an exemplary computing environment in which the electronic device of FIG. 1 may be implemented.

FIG. 10 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 6.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 604 may be transformed—e.g., to hold different data.

Non-volatile storage device 706 may include physical devices that are removable and/or built-in. Non-volatile storage device 94 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The above systems and methods allow for a store to quickly bring to the attention of a shopper a target product out of the many other products in the store. Once the electronic devices are in place and automatically trained using the above described training procedures, the devices may operate to indicate target products with messages customized based on the identity of the target product as well as the location of the target product within the store. No additional effort is required from a store employee, however manual modification of the functioning of the device is possible. Additionally, when multiple devices are employed, the devices are able to track various aspects of shopper behavior such as shopper traffic through the store and the amount of time shoppers may spend in any particular location. These features allow a store employee to let the electronic devices indicate top-selling products to a shopper or indicate products based on any other criteria. The ability of the electronic device to monitor shopping behavior provides the store employee with valuable information that may be used for a variety of purposes including product placement direction of shopper traffic. The electronic device also benefits the shopper by indicating the location of a desired product to the shopper out of the many other products that may be stocked in the store thereby allowing the shopper to more quickly find desired products. The systems and methods described herein provide advantages over existing methods (such as placing signs near a top-selling product) which require significantly more effort to employ and do not react to shopper behavior or automatically adapt to changing trends in sales.

The invention claimed is:

1. An electronic device for a store comprising:
a front-facing camera;
a rear-facing camera;
a display; and
processing circuitry configured to:
receive wirelessly from a remote computing device an identity of at least one target product that meets one or more predetermined product criteria;
capture a first image via the rear-facing camera;
determine that the target product proximate the electronic device is depicted in the first image;
capture a second image via the front-facing camera;
detect a shopper in a vicinity of the electronic device is depicted in the second image; and
in response to determining that the target product proximate the electronic device is depicted in the first image and detecting that the shopper in a vicinity of the electronic device is depicted in the second image, displaying a message related to the target product on the display, wherein
the remote computing device is further configured to store a stored image of the target product, and to store the message related to the target product, and
determining that the target product proximate the electronic device is depicted in the first image includes:
extracting from a series of rear images a plurality of features, and
comparing the first image to the stored image of the target product.

2. The electronic device for a store of claim 1, further configured to, via the rear-facing camera, determine a number of the target product remaining and notify a store employee if the number is below a predetermined limit.

3. The electronic device for a store of claim 1, further configured to, via the rear-facing camera, determine a number of the target products remaining and inhibit display of a second message when the number of the target product remaining is below a predetermined limit.

4. The electronic device for a store of claim 1, wherein the remote computing device is configured to record sales logs of target products in the store.

5. The electronic device for a store of claim 1, wherein detecting that the shopper is within a vicinity of the electronic device includes detecting that the shopper is within a predetermined distance of the electronic device and that a gaze of the shopper is within a predetermined angle with respect to a plane of the display.

6. The electronic device for a store of claim 1, wherein the one or more predetermined product criteria include: being one of a plurality of top selling products or being selected by an administrator.

7. The electronic device for a store of claim 1, further configured to:
record respective positions of one or more shoppers within the store; and
convey the respective positions of the one or more shoppers to the remote computing device.

8. The electronic device for a store of claim 1, further configured to:
record a duration of the shopper in a vicinity of the electronic device; and
convey the duration of the shopper in a vicinity of the electronic device to the remote computing device.

9. The electronic device for a store of claim 1, further comprising a speaker and further configured to deliver an auditory message.

10. The electronic device for a store of claim 1, further configured to:
record a change in the first image via the rear-facing camera;
record a pickup of the target product; and
record a duration between displaying the message and the pickup of the target product.

11. The electronic device for a store of claim 10, wherein the first image is a rear image;
the second image is a front image; and
the processing circuitry is further configured to, in a training phase:
capture a series of rear images from the rear-facing camera, each of the series of rear images having an associated timestamp;
capture a series of front images from the front-facing camera, each of the series of front images having an associated timestamp; and
generate a training data set with rear images, front images, a first message template, and a second message template;
alternately display the message based on the first message template and the second message template; and
train an artificial intelligence model to predict whether the first message template or the second message template results in a higher pickup.

12. The electronic device for a store of claim 11, wherein the processing circuitry is further configured to:
in a runtime phase:
display a message related to the target product on the display by outputting, in response to receiving a runtime input, an action in the form of the message according to the message template.

13. The electronic device for a store of claim 10, wherein:
the first image is a rear image;
the second image is a front image; and
the processing circuitry is further configured to, in a runtime phase:
capture a series of rear images from the rear-facing camera, each of the series of rear images having an associated timestamp;
capture a series of front images from the front-facing camera, each of the series of front images having an associated timestamp;
determine that the target product proximate the electronic device is depicted in the first image by extracting from the series of rear images a plurality of features as input into an artificial intelligence model;
detect that the shopper in a vicinity of the electronic device is depicted in the second image by extracting from the series of front images a plurality of features as input into the artificial intelligence model; and
display the message related to the target product on the display by outputting in response to receiving a runtime input an action in the form of the message according to a message template.

14. The electronic device for a store of claim 13, wherein the artificial intelligence model has been trained on the plurality of features from the front images as training time input and from the rear images as ground truth classification of the front-facing images at training time.

15. The electronic device for a store of claim 13, wherein the artificial intelligence model is a reinforcement learning model and uses as a reward a pickup ratio.

16. The electronic device for a store of claim 15, wherein the pickup ratio is defined as a number of pickups of the target product divided by a number of messages displayed.

17. The electronic device for a store of claim 13, wherein the message template is optimized by the artificial intelligence model and includes at least one of the following:
   a message duration;
   a message selection, wherein one of a plurality of predetermined messages is selected by the artificial intelligence model.

18. The electronic device for a store of claim 1, wherein the message includes a pulsing illuminated textual message or image.

19. An electronic device for a store comprising:
   a front-facing camera;
   a rear-facing camera;
   a display; and
   processing circuitry configured to:
      receive wirelessly from a remote computing device an identity of at least one target product that meets one or more predetermined product criteria;
      capture a first image via the rear-facing camera;
      determine that the target product proximate the electronic device is depicted in the first image;
      capture a second image via the front-facing camera;
      detect a shopper in a vicinity of the electronic device is depicted in the second image; and
      in response to determining that the target product proximate the electronic device is depicted in the first image and detecting that the shopper in a vicinity of the electronic device is depicted in the second image, displaying a message related to the target product on the display wherein
   displaying a message related to the target product is further conditioned upon one or more additional message conditions determined by at least one of the following:
      a shopper density feature;
      a product density feature;
      a time density feature;
      a shopper distance feature; and
      a shopper gaze feature; wherein
      displaying the message related to the target product on the display is performed in response to determining that the target product proximate the electronic device is depicted in the first image and detecting that the shopper in a vicinity of the electronic device is depicted in the second image, and further in response to determining that the additional message condition is satisfied.

* * * * *